(12) United States Patent
Mills et al.

(10) Patent No.: US 9,460,879 B2
(45) Date of Patent: Oct. 4, 2016

(54) CIRCUIT BREAKER ASSEMBLY INCLUDING A PLURALITY OF CONTROLLABLE CIRCUIT BREAKERS FOR LOCAL AND/OR REMOTE CONTROL

(71) Applicant: Labinal, LLC, Denton, TX (US)

(72) Inventors: Patrick Wellington Mills, Bradenton, FL (US); James Michael McCormick, Bradenton, FL (US)

(73) Assignee: LABINAL, LLC, Denton, TX (US)

( * ) Notice: Subject to any disclaimer, the term of this patent is extended or adjusted under 35 U.S.C. 154(b) by 59 days.

(21) Appl. No.: 14/546,113

(22) Filed: Nov. 18, 2014

(65) Prior Publication Data

US 2015/0137915 A1 May 21, 2015

Related U.S. Application Data

(60) Provisional application No. 61/906,983, filed on Nov. 21, 2013.

(51) Int. Cl.
| | |
|---|---|
| *H01H 50/14* | (2006.01) |
| *H01H 9/28* | (2006.01) |
| *H01H 71/12* | (2006.01) |
| *H01H 89/04* | (2006.01) |

(52) U.S. Cl.
CPC .............. *H01H 50/14* (2013.01); *H01H 9/28* (2013.01); *H01H 71/12* (2013.01); *H01H 89/04* (2013.01)

(58) Field of Classification Search
CPC .......... H02B 1/056; H02B 1/04; H02B 1/20; H01H 71/12; H01H 9/28; H01H 50/14; H01H 89/04
See application file for complete search history.

(56) References Cited

U.S. PATENT DOCUMENTS

| | | | | | |
|---|---|---|---|---|---|
| 1,541,363 | A | * | 6/1925 | Locke | H01H 21/50 200/17 R |
| 2,805,294 | A | * | 9/1957 | Edmunds | H02B 1/056 200/50.31 |
| 3,005,934 | A | * | 10/1961 | Vogelsberg | H02B 1/056 174/99 B |
| 3,214,556 | A | * | 10/1965 | Zimsky | H01H 3/30 200/400 |
| 5,373,411 | A | | 12/1994 | Grass et al. | |

(Continued)

FOREIGN PATENT DOCUMENTS

JP         H0731010         1/1995

OTHER PUBLICATIONS

International Search Report filed in PCT/US2014/066063 mailed Feb. 20, 2015.

*Primary Examiner* — Mohamad Musleh
(74) *Attorney, Agent, or Firm* — Rankin, Hill & Clark LLP

(57) ABSTRACT

A circuit breaker assembly includes a plurality of controllable circuit breakers. Each of the controllable circuit breakers includes separable contacts, an operating mechanism structured to open and close the separable contacts, a trip mechanism cooperating with the operating mechanism to trip open the separable contacts, a first line terminal, a second load terminal, and at least a third terminal. The trip mechanism is structured to trip open the separable contacts responsive to a signal from the third terminal. The circuit breaker assembly also includes a toggle electrical switching apparatus that includes separable contacts electrically connected between the third terminal and ground, and a toggle operating member structured to open and close the separable contacts of the toggle electrical switching apparatus.

23 Claims, 7 Drawing Sheets

(56) References Cited

U.S. PATENT DOCUMENTS

| | | | | |
|---|---|---|---|---|
| 5,466,974 A | * | 11/1995 | Sutrina | H02B 1/04 307/38 |
| 5,612,579 A | * | 3/1997 | Wisbey | B64D 41/00 290/4 R |
| 6,002,580 A | * | 12/1999 | LeVantine | H02B 1/056 361/634 |
| 6,315,580 B1 | * | 11/2001 | Hurtubise | H01H 73/08 361/627 |
| 6,414,245 B1 | * | 7/2002 | Lopp | H01H 1/5805 174/255 |
| 6,861,931 B1 | | 3/2005 | Corliss et al. | |
| 7,280,337 B2 | | 10/2007 | Engel | |
| 7,532,096 B2 | * | 5/2009 | Zindler | H01H 71/04 200/308 |
| 7,570,146 B2 | | 8/2009 | Mills et al. | |
| 8,094,436 B2 | | 1/2012 | Mills et al. | |
| 2010/0133076 A1 | | 6/2010 | Mills et al. | |

\* cited by examiner

US 9,460,879 B2

CIRCUIT BREAKER ASSEMBLY INCLUDING A PLURALITY OF CONTROLLABLE CIRCUIT BREAKERS FOR LOCAL AND/OR REMOTE CONTROL

BACKGROUND

1. Field

The disclosed concept pertains generally to electrical switching apparatus and, more particularly, to controllable apparatus, such as, for example, controllable circuit breakers. The disclosed concept further pertains to systems including electrical switching apparatus.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and tight commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Subminiature circuit breakers are used, for example, in aircraft or aerospace electrical systems where they not only provide overcurrent protection but also serve as switches for turning equipment on and off. As such, they are subjected to heavy use and, therefore, must be capable of performing reliably over many operating cycles. They also must be small to accommodate the high-density layout of circuit breaker panels, which make circuit breakers for numerous circuits accessible to a user. Aircraft electrical systems usually consist of hundreds of circuit breakers, each of which is used for a circuit protection function as well as a circuit disconnection function through a push-pull handle. The push-pull handle is moved from in-to-out in order to open the load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

U.S. Pat. No. 7,570,146 discloses a panel mountable aircraft circuit breaker including a housing having an opening, separable contacts, an operating mechanism structured to open and close the contacts, and a trip mechanism structured to cooperate with the operating mechanism to trip open the operating mechanism. The trip mechanism includes a first bimetal to trip open the operating mechanism responsive to a thermal fault, a second ambient compensation bimetal to compensate the first bimetal, and an arc fault trip circuit to trip open the operating mechanism responsive to an arc fault.

U.S. Pat. No. 8,094,436 discloses a plug-in circuit breaker assembly.

U.S. Pat. No. 7,280,337 discloses a controllable circuit breaker comprising: a housing; a first input adapted to receive an external close signal; a second input adapted to receive an external open signal; a third input adapted to receive a control voltage; a set of main contacts; an operating mechanism for opening and closing the set of main contacts; a set of secondary contacts connected in series with the set of main contacts; a latching solenoid including a plunger latchable to a first position which closes the set of secondary contacts and to a second position which opens the set of secondary contacts, a first coil which when energized operates the plunger to the first position and a second coil which when energized operates the plunger to the second position, the first and second coils having a common node which is electrically connected to the third input; and a non-mechanical, electronic control circuit within the housing, the non-mechanical, electronic control circuit adapted to receive the external close and open signals from the first and second inputs and responsively energize the first and second coils, respectively, from the third input for a predetermined time. A non-mechanical, electronic circuit within the circuit breaker housing is adapted to provide a direct current status signal at an output when separable contacts are closed and a first or line terminal is energized with an alternating current voltage. The direct current status signal is representative of a second or load terminal being energized with the alternating current voltage.

There is room for improvement in circuit breaker assemblies.

SUMMARY

According to one aspect, a circuit breaker assembly includes a plurality of controllable circuit breakers. Each of the controllable circuit breakers includes separable contacts, an operating mechanism structured to open and close the separable contacts, a trip mechanism cooperating with the operating mechanism to trip open the separable contacts, a first line terminal, a second load terminal, and at least a third terminal. The trip mechanism is structured to trip open the separable contacts responsive to a signal from the third terminal. The circuit breaker assembly also includes a toggle electrical switching apparatus that includes separable contacts electrically connected between the third terminal and ground, and a toggle operating member structured to open and close the separable contacts of the toggle electrical switching apparatus.

According to another aspect, a circuit breaker assembly includes a backplane that includes an electrical bus structure, and a plurality of plug-in sockets. The circuit breaker assembly also includes a plurality of controllable circuit breakers. Each of the controllable circuit breakers includes separable contacts, an operating mechanism structured to open and close the separable contacts, a trip mechanism cooperating with the operating mechanism to trip open the separable contacts, a first plug-in member, a second plug-in member, and at least a third terminal. The first and second plug-in members plug into two of the plug-in sockets. The trip mechanism is structured to trip open the separable contacts responsive to a signal from the third terminal. The circuit breaker assembly also includes a toggle electrical switching apparatus that includes separable contacts electrically connected between the third terminal and ground, and a toggle operating member structured to open and close the separable contacts of the toggle electrical switching apparatus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an irate greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with remote control circuit breakers, although the disclosed concept is applicable to a wide range of controllable circuit breakers.

The disclosed concept employs a plurality of remote control circuit breakers (RCCBs) having a modular construction, thereby allowing electrical ganging or electrical linking of plural poles in order to control the RCCBs remotely and/or locally at the point of use. For example and without limitation, an on-board toggle switch or toggle circuit breaker is employed to electrically open and close the plural RCCBs at the point of use. The RCCBs can also be remotely controlled by electrical signals.

Figure 6:
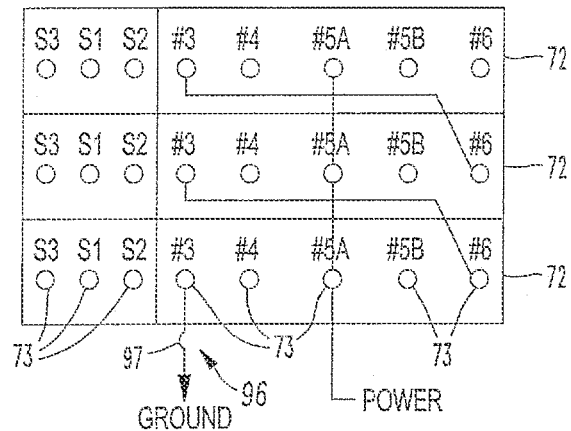
FIG. 6 is a wiring diagram of the socket connectors of three controllable circuit breakers in accordance with another embodiment of the disclosed concept.
Figure 7:
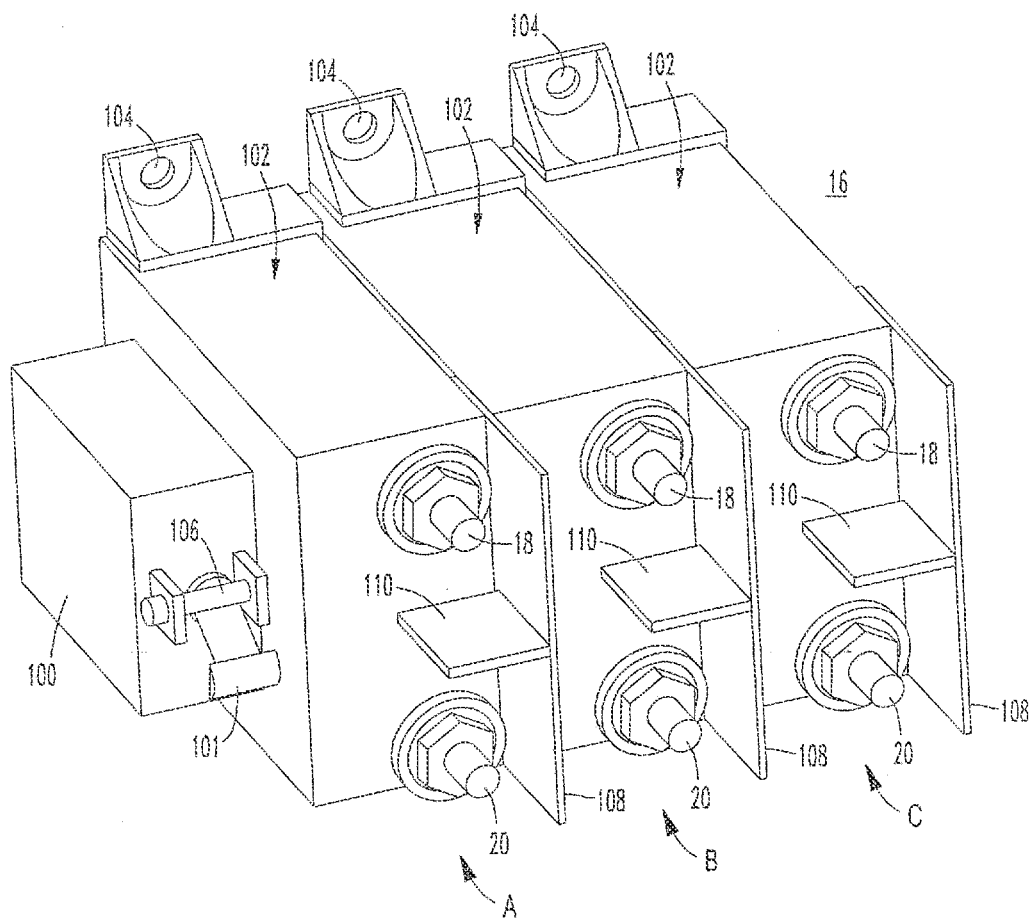
FIG. 7 is an isometric view of three controllable circuit breakers in accordance with another embodiment of the disclosed concept.

The disclosed concept provides: (1) a modular structure to address single-pole (FIGS. 1-5 and 8) and multi-pole applications (FIGS. 6 and 7); (2) electrical opening and closing responsive to near zero operator mechanism force (FIGS. 1-5 and 7) as contrasted with a conventional mechanical latch having significantly greater operator mechanism force; (3) on-site lockout/tag out maintenance of the RCCBs or system (FIGS. 1-5 and 7); and (4) a high power cut off switch and overload protection for direct faults including a contactor/relay with overcurrent protection, which can all be controlled at the RCCB (e.g., without limitation, a master on/off panel for a cargo handling system; a power panel in a marine vessel) without the use of fuses (FIGS. 1-5). The modular structure addresses single-pole and multi-pole applications by permitting one, two or more, various sources, and various voltages to be slaved together.

FIGS. 1-5 show an assembly 2 that packages RCCBs 4 employing plug-in posts 6,8 (FIG. 5) to sockets 10,12 of an electrical bus structure, such as the example bus rail structure 14. Alternatively, each pole of the three-pole RCCB 16 of FIG. 7 has two threaded posts 18,20. The example assembly 2 can be employed, for example and without limitation, for high current packaging applications.

Figure 1:
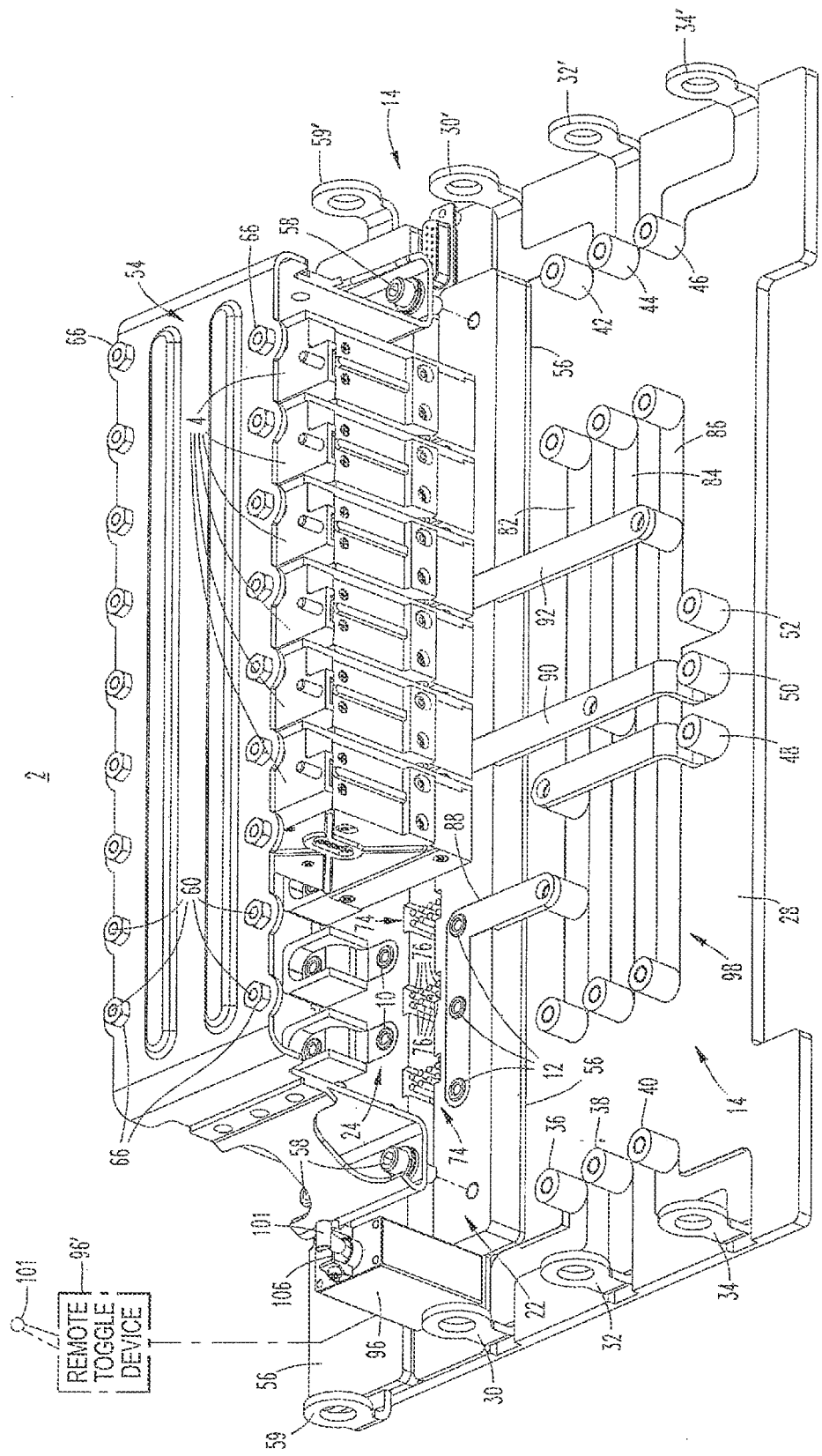
FIGS. 1 and 2 are isometric views of an assembly including a plurality of remotely controlled circuit breakers and a local control mechanism in accordance with embodiments of the disclosed concept.

The example assembly 2 shown in FIG. 1 includes six RCCBs 4 with three RCCBs 4 (shown in FIGS. 2 and 4) not being installed in order to show a feeder or line buss rail 22 and an output or load buss rail 24 of the bus rail structure 14. Suitable electrical connections, such as the example sockets 26 (shown in FIGS. 2-5), electrically connect to a number of loads (not shown). A backplane 28 includes: (1) three independent feeds 30,32,34 for three-phases 36,38,40, respectively, to an optional first plug-in tie-contactor C1 (shown in phantom line drawing); (2) three independent feeds 30',32',34' for three-phases 42,44,46, respectively, to an optional second plug-in tie-contactor C2 (shown in phantom line drawing); and (3) direct electrical connection to three-phases 48,50,52 with or without a separate external contactor (not shown).

A ground bracket 54 provides mechanical retention of the RCCBs 4 and provides a common ground for internal RCCB electronics (not shown). The ground bracket 54 is electrically connected to a ground bus 56 by two fasteners 58 at each end. The ground bus 56 of the backplane 28 is electrically connected to a ground terminal 59,59' at each end. The ground bracket 54 is also electrically connected to two threaded mounting posts 60 of an RCCB mounting bracket 62 (FIG. 5) that pass through openings 64 (shown in hidden line drawing in FIG. 4) and are secured by nuts 66. Each RCCB mounting bracket 62 is secured to the RCCB enclosure 68 by two fasteners 70 (FIG. 5), which provide a ground path for the RCCB electronics.

The RCCB 4 includes the two plug-in posts 6,8 (e.g., pins for load and line, respectively) for electrical connection to the corresponding sockets 10,12 of the backplane 28. The RCCB 4 also includes a socket connector 72 (e.g., without limitation, eight sockets 73 shown in FIG. 6) for electrical connection to a corresponding pin header 74 of the backplane 28. The example pin header 74 includes, for example, eight pins 76 for an indicator/control unit (ICU) signal, control power, an open/close signal, and auxiliary circuits. The backplane pin header 74 is electrically connected through a control printed circuit board 78 (FIG. 5) to a number of auxiliary and ICU output connectors 80 (FIG. 5), which communicate corresponding signals to or from a number of cockpit toggle circuit breaker(s), lights and other systems (not shown).

Figure 2:
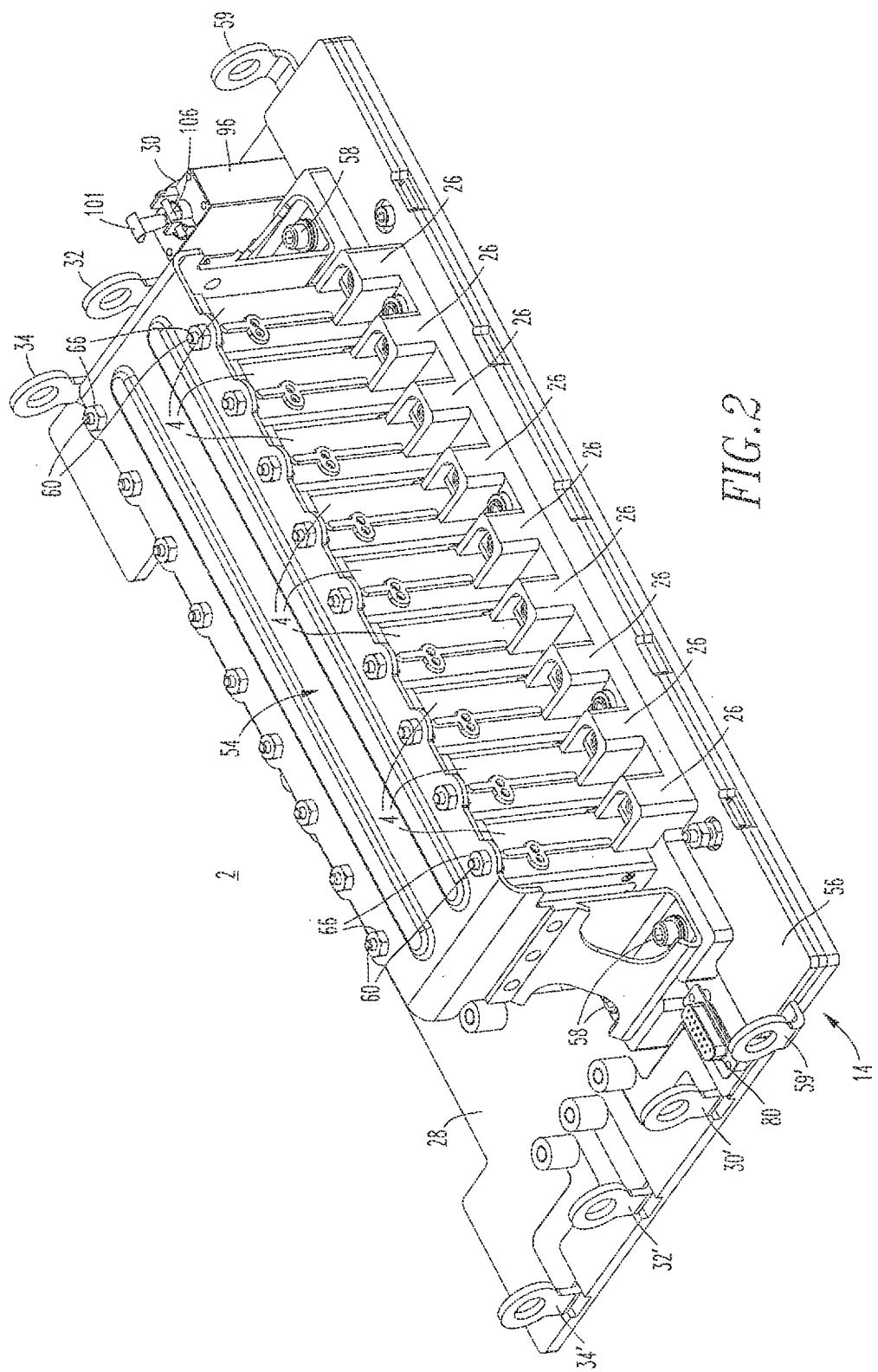
Figure 4:
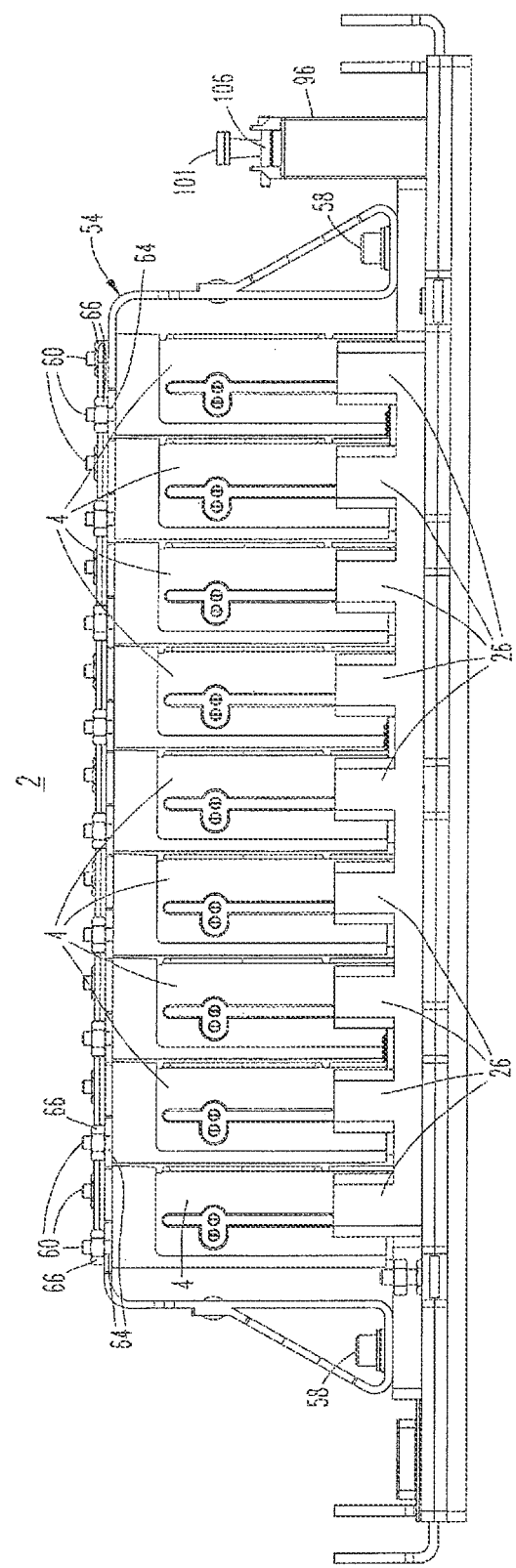
FIG. 4 is a rear vertical elevation view of the assembly of FIG. 1.
Figure 5:
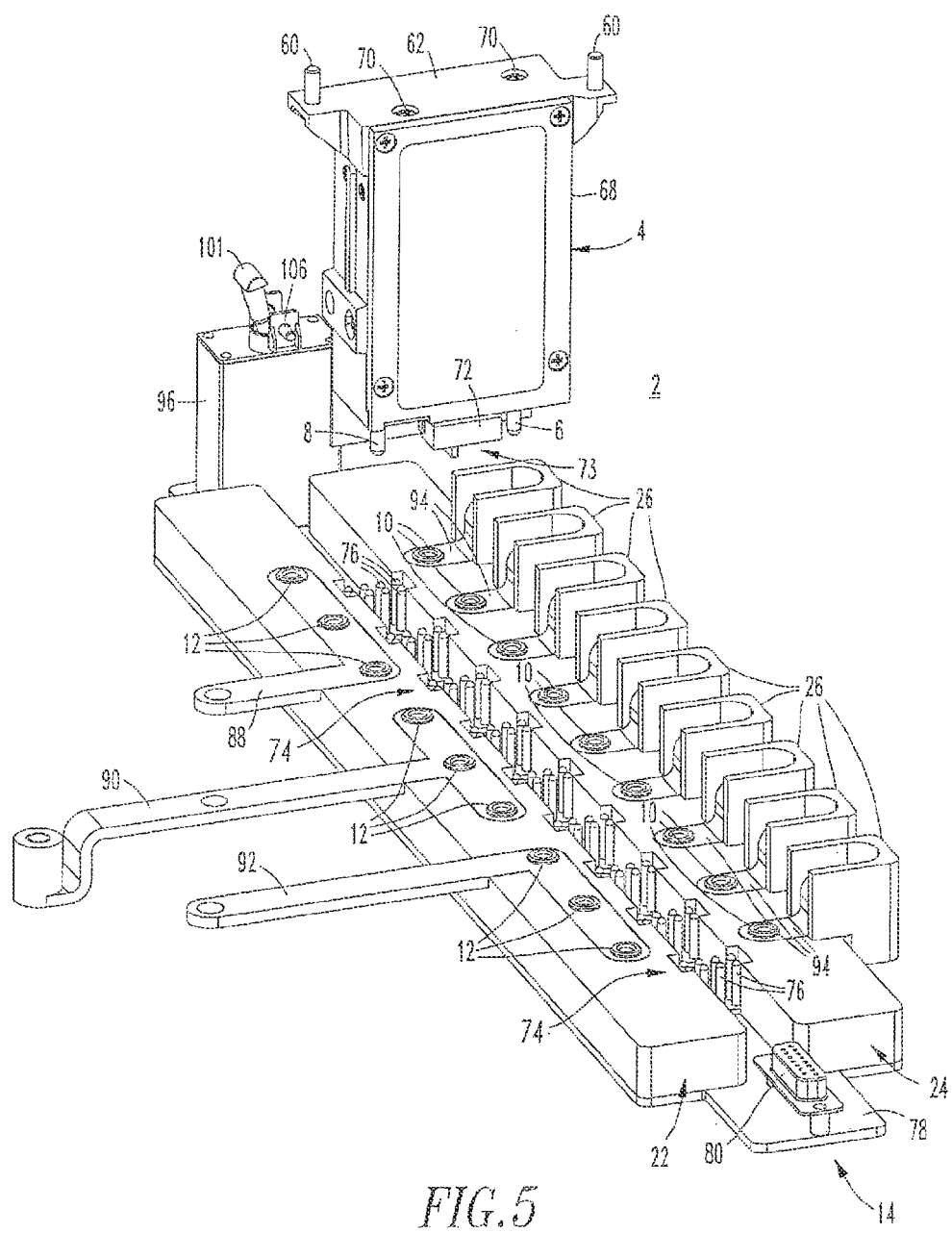
FIG. 5 is a partially exploded isometric view of part of the assembly of FIG. 1.

The feeder or line buss rail 22 holds the embedded sockets 10 for line connections to the nine RCCBs 4 (shown in FIGS. 2 and 4). Each set of three of the nine line sockets 10 is electrically connected to a corresponding one of three common phase A, B or C busses 82,84,86. The example arrangement of the L-shaped, T-shaped and inverted L-shaped common phase busses 88,90,92 (FIG. 5) provides a suitable backplane size consolidation of the corresponding phase A, B and C busses 82,84,86 (FIG. 1). The output or load buss rail 24 holds the nine embedded load sockets 10, each of which has a load buss bar 94 and a corresponding electrical connection, such as the example socket 26, for electrically connecting a number of loads (not shown). For example, each of the sockets 26 can accept plural conductors (not shown) for multiple loads (e.g., single-phase loads; plural-phase loads, such as three-phase loads).

Figure 8:
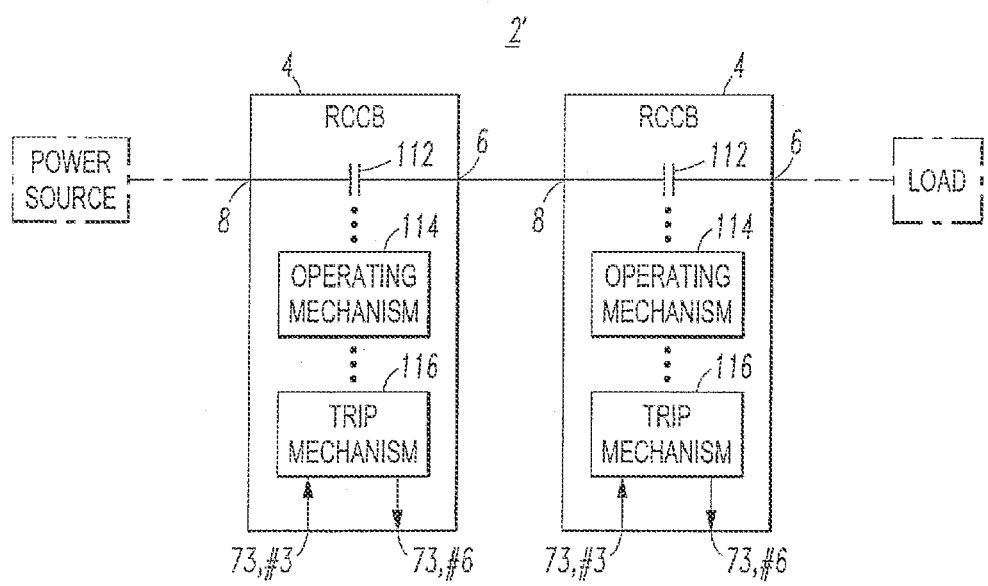
FIG. 8 is a block diagram in schematic form of an assembly including two remotely controlled circuit breakers in accordance with another embodiment of the disclosed concept.

The disclosed concept allows the RCCBs 4 to be electrically connected in series as shown in FIG. 8, in order to increase the operating voltage (e.g., without limitation, 115 VAC to 230 VAC or 450 VAC by increasing the total arc gap). In this example, the plug-in backplane 28 is employed and the feeder or line buss rail 22 and the output or load buss rail 24 are suitably modified to provide serial electrical connections of two or more of the RCCBs 4.

The example on-board toggle switch or toggle circuit breaker 96 is employed to electrically open and close the RCCBs 4 at the point of use. Alternatively, a remote toggle switch or toggle circuit breaker can be employed, as shown by the example remote toggle 96' (shown in phantom line drawing in FIG. 1). In the example configuration, one (#3) of the sockets 73 of the example socket header 72 (a portion of which is shown in FIG. 6) for each of the RCCBs 4 is for the ICU signal and is normally grounded by the normally closed separable contacts 97 (FIG. 6) of the normally closed toggle circuit breaker 96. This causes the RCCBs to assume a closed state. Whenever one (or more) of the RCCBs 4 detects a thermal overload condition (e.g., without limitation, based upon a suitable $I^2t$ overload detection function) of one or more of the corresponding loads (not shown), such RCCB 4 trips and outputs a suitable current through the ICU signal to the toggle circuit breaker 96. This current is selected to exceed the instantaneous trip threshold of the toggle circuit breaker 96, which responsively trips open. Whenever the other non-tripped RCCBs 4 detect that the ICU signal is not grounded by the tripped open toggle circuit breaker 96, those other non-tripped RCCBs 4 then responsively trip open.

Although a local or on-board toggle switch or toggle circuit breaker 96 is shown, a suitable toggle switch or toggle circuit breaker, such as the example remote toggle device 96', could be remotely located, for example and without limitation, in an aircraft or aerospace cockpit (not shown) and be a thermal circuit breaker with the toggle operating member 101. This would allow remote opening and closing of a select RCCB 4 or an entire bus rail of RCCBs 4. Similarly, if one of the RCCBs 4 trips from a thermal overload it can (if desired) send a suitable current to the remote toggle circuit breaker to indicate a fault (through the ICU signal). A toggle switch preferably can employ near zero operator mechanism force.

The example socket connector 72 for electrical connection to the backplane pin header 74 includes sockets 73 for three auxiliary contact signals (normally open (NO) S2, normally closed (NC) S3, and common S1 for the NO and NC signals), the ICU signal (#3), 28 VDC or 115 VAC power (#5A), two internally connected sockets for 115 VAC power (#5A and #5B), optional back-up 28 VDC (#4) (e.g., without limitation, a second 28 VDC battery source (not shown) to the RCCB 4 in case a first 28 VDC main source (not shown) falls below a minimum operating level), and a signal (#6) (FIG. 6) that is normally ground and otherwise open for a trip. The ICU signal is connected to an open (when the separable contacts 97 of the circuit breaker 96 are open) to cause a trip of the RCCB 4, and otherwise sources current when the RCCB 4 detects a trip condition. For example, for a thermal trip, a suitable magnitude of current is sourced from the ICU signal (#3), in order to cause the local toggle circuit breaker 96 to trip open and, thereby, cause tripping of all of the corresponding RCCBs 4.

Alternatively, the RCCBs 4 can be electrically connected from the IWTS socket connector 72 of one of the RCCBs 4 to the IWTS socket connector 72 of another one of the RCCBs 4 as shown in FIG. 6 in order to slave them together and form a multi-pole device. The ICU signal (#3) of one of the RCCBs 4 is normally grounded by the normally closed separable contacts 97 of the normally closed toggle circuit breaker 96. The signal (#6) of that one of the RCCBs 4 is electrically connected to the ICU signal (#3) of the next one of the RCCBs 4. Finally, the signal (#6) of that one of the RCCBs 4 is electrically connected to the ICU signal (#3) of the next one of the RCCBs 4. This permits, for example and without limitation, three phases A,B,C of a three-phase load (not shown) to be controlled by three RCCBs 4 as a three-pole device.

Figure 3:
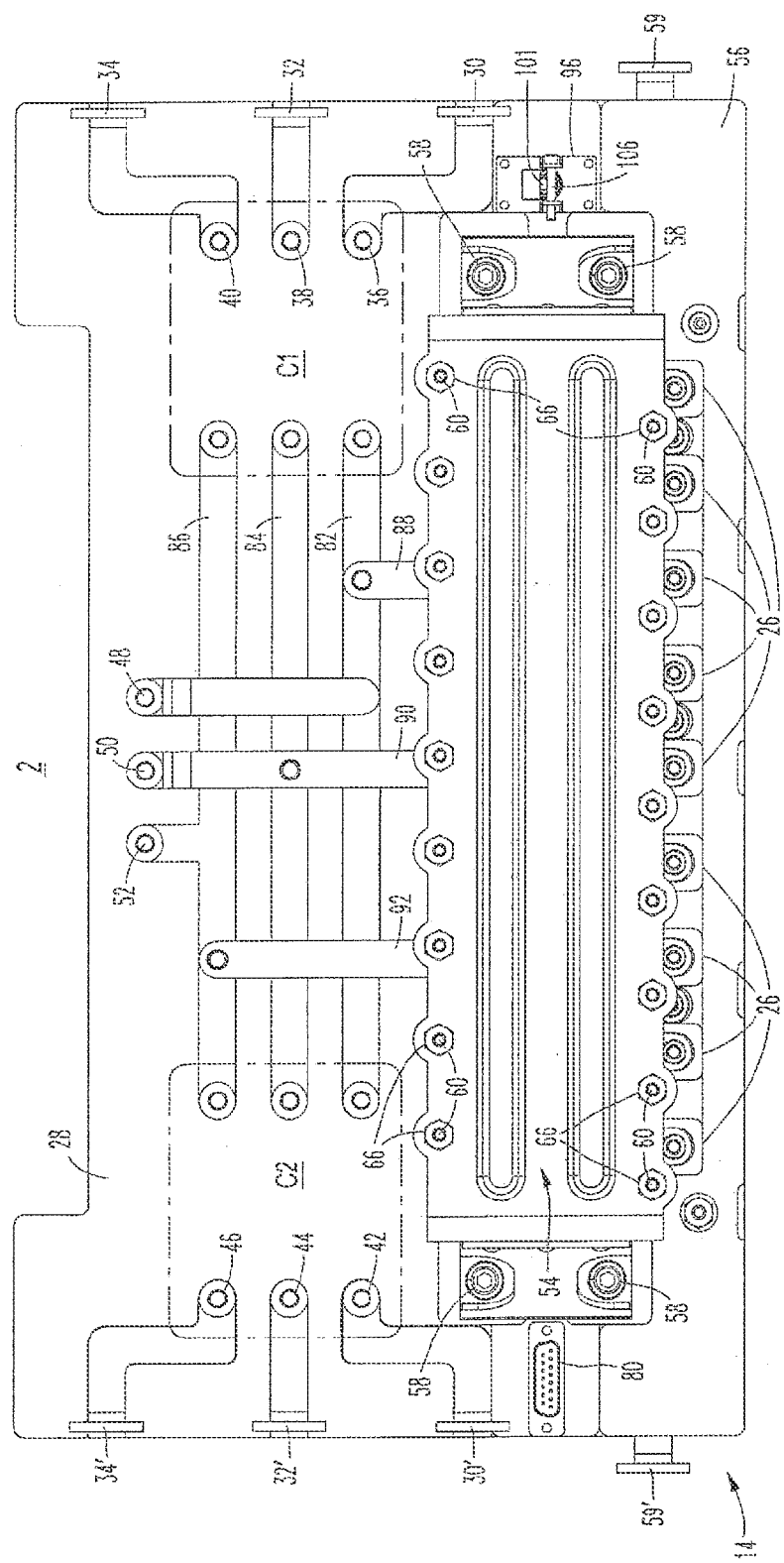
FIG. 3 is a top plan view of the assembly of FIG. 1.

As shown in FIGS. 1 and 3, the backplane 28 employs an integrated wire termination system (IWTS) 98 for the feeds 30,32,34 and the phases 36,38,40, the feeds 30',32',34' and the phases 42,44,46, and the phases 48,50,52.

The local toggle circuit breaker 96 is on-board and is mounted to the backplane 28 (e.g., without limitation, a printed wiring assembly (PCA)) (FIGS. 1-5).

Alternatively, as shown in FIG. 7, a local toggle switch or toggle circuit breaker 100 is coupled to the side of a stand-alone stack of three example RCCBs 102. Each of these RCCBs 102 includes mounting holes 104 and the two threaded posts 18,20. The local toggle switch or toggle circuit breaker 100 includes a toggle operating member 101 structured to open and close the separable contacts (not shown, but see the separable contacts 97 of FIG. 6) thereof, and preferably includes a lockout/tag out mechanism 106 (e.g., without limitation, a cross-bar which prevents the circuit breaker 100 from being opened by the toggle operating member 101 unless a separate action is taken to remove the cross-bar), which can be configured with various switches, guards or interlocks for servicing. Similar to the local or on-board toggle switch or toggle circuit breaker 96 of FIGS. 1-5, the local toggle switch or toggle circuit breaker 100 opens and closes all the RCCBs 102 at the same time. Two key benefits include providing a relatively very low user force to open and close power banks, and providing the lockout/tag out mechanism 106 on the main electrical power panel RCCBs 102 at the point of use.

The adjacent local toggle switch or toggle circuit breaker 100 (or an electro-mechanical switchable circuit breaker) has the conventional lockout/tag out mechanism 106 and provides a common mechanism to open and close multiple RCCBs 102 with relatively very low operator force. The toggle circuit breaker 100 also allows the RCCBs 102 to be opened responsive to overcurrent from other systems (not shown).

In FIG. 7, a suitable barrier 108 is employed between each pair of adjacent poles and a suitable barrier 110 is employed between the two threaded posts 18,20 of each pole for electrical isolation from pole-to-pole and from line-to-load, respectively.

FIG. 8 shows another assembly 2' of the RCCBs 4 of FIG. 1 in which two or more of these RCCBs are electrically connected in series. Otherwise, the assembly 2' can be similar to the assembly 2 of FIG. 1 in which the RCCBs 4 are not electrically connected in series. As is conventional, each of the RCCBs 4 includes separable contacts 112, an operating mechanism 114 structured to open and close the separable contacts 112, and a trip mechanism 116 cooperating with the operating mechanism 114 to trip open the separable contacts 112.

The electrically opened and closed RCCBs 4,102 disclosed herein employ a near zero operator mechanism force with the on-board toggle switch or toggle circuit breaker 96 or the local toggle switch or toggle circuit breaker 100 that can be locked-out/tagged-out as contrasted with a conventional mechanical latch.

The modular structure of the disclosed concept addresses single-pole (FIGS. 1-5 and 8) and multi-pole applications (FIGS. 6 and 7) by permitting: (1) one line or source voltage, (2) two or more line or source voltages, (3) various source voltages or phases (FIGS. 1-5), and (4) various source voltages or phases to be slaved together (FIG. 6). For example and without limitation, for 28 VDC, there can be one toggle circuit breaker 96 per RCCB 4. For three-phase 115 VAC, each of three phases can power three RCCBs 4 for three or more loads, and the nine RCCBs 4 can be controlled by one toggle circuit breaker 96 (FIGS. 1-5). For three-phase 115 VAC, each of three phases can power three RCCBs 4 for three or more loads, and the three RCCBs 4 per phase can be controlled by three toggle circuit breakers (not shown, but similar to the one toggle circuit breaker 96), one for each phase. For example and without limitation, phase A powers motors, phase B powers pumps, and phase C powers fans.

The example assembly 2 including the RCCBs 4 employs plug-in posts 6,8 to the feeder or line buss rail 22 and the output or load buss rail 24 for high current applications.

Each of the example RCCBs 4,102 includes two plug-in posts 6,8 (FIGS. 1-5 and 8) or two threaded posts 18,20 (FIG. 7). For example and without limitation, the RCCBs 4,102 are rated up to 200 A.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit breaker assembly comprising:
   a plurality of controllable circuit breakers, each of said controllable circuit breakers comprising:
   separable contacts,
   an operating mechanism structured to open and close said separable contacts,
   a trip mechanism cooperating with said operating mechanism to trip open said separable contacts,
   a first line terminal,
   a second load terminal, and
   at least a third terminal,
   wherein said trip mechanism is structured to trip open said separable contacts responsive to a signal from said third terminal; and
   a toggle electrical switching apparatus comprising:
   separable contacts electrically connected between the third terminal and ground, and
   a toggle operating member structured to open and close the separable contacts of said toggle electrical switching apparatus,
   wherein said at least a third terminal is said third terminal and a fourth terminal; wherein said fourth terminal is normally electrically connected to said ground and otherwise is open when said trip mechanism cooperates with said operating mechanism to trip open said separable contacts; wherein a first one of said controllable circuit breakers comprises the third terminal electrically connected to the separable contacts of said toggle electrical switching apparatus and the fourth terminal electrically connected to the third terminal of a second one of said controllable circuit breakers; and wherein a third one of said controllable circuit breakers comprises the third terminal electrically connected to fourth terminal of said second one of said controllable circuit breakers, in order to electrically slave together said first one, said second one and said third one of said controllable circuit breakers as a three-pole controllable circuit breaker.

2. The circuit breaker assembly of claim 1 wherein each of said controllable circuit breakers is a single-pole remote control circuit breaker structured to be electrically connected to a corresponding power source by the first line terminal and a corresponding load by the second load terminal.

3. The circuit breaker assembly of claim 1 wherein a plurality of said controllable circuit breakers form a plural-pole circuit breaker; and wherein each of said plurality of said controllable circuit breakers is structured to be electrically connected to a corresponding phase of a corresponding power source by the first line terminal and electrically connected to a corresponding phase of a corresponding load by the second load terminal.

4. The circuit breaker assembly of claim 1 wherein said toggle electrical switching apparatus is a toggle switch; and wherein the toggle operating member is structured to move between a first position and a second position to open and close the separable contacts of said toggle switch with about zero operator mechanism force.

5. The circuit breaker assembly of claim 1 wherein said toggle electrical switching apparatus further comprises a lockout/tag out mechanism cooperating with the toggle operating member to maintain said toggle operating member in one of the said first position and said second position.

6. The circuit breaker assembly of claim 1 wherein said first line terminal and said second load terminal are threaded posts.

7. The circuit breaker assembly of claim 1 wherein said first line terminal and said second load terminal are plug-in posts.

8. The circuit breaker assembly of claim 1 wherein said toggle electrical switching apparatus is proximate said plurality of controllable circuit breakers.

9. The circuit breaker assembly of claim 1 wherein said toggle electrical switching apparatus is remote from said plurality of controllable circuit breakers.

10. The circuit breaker assembly of claim 1 wherein said toggle electrical switching apparatus is a local toggle switch or toggle circuit breaker coupled to one side of a stand-alone stack of said controllable circuit breakers.

11. The circuit breaker assembly of claim 10 wherein said first line terminal and said second load terminal are two threaded posts; wherein a first barrier is disposed between two adjacent poles formed by an adjacent pair of said controllable circuit breakers; and wherein a second barrier is disposed between said two threaded posts for each of said controllable circuit breakers that form a corresponding pole.

12. A circuit breaker assembly comprising:
    a backplane comprising:
    an electrical bus structure; and
    a plurality of plug-in sockets, wherein the electrical bus structure comprises a feeder or line buss rail carrying a plurality of said plug-in sockets and an output or load buss rail carrying a plurality of said plug-in sockets;
    a plurality of controllable circuit breakers, each of said controllable circuit breakers comprising:
    separable contacts,
    an operating mechanism structured to open and close said separable contacts,
    a trip mechanism cooperating with said operating mechanism to trip open said separable contacts,
    a first plug-in member,
    a second plug-in member, and
    at least a third terminal,
    wherein said first and second plug-in members plug into two of the plug-in sockets, and wherein said trip mechanism is structured to trip open said separable contacts responsive to a signal from said third terminal; and a toggle electrical switching apparatus comprising:
separable contacts electrically connected between the third terminal and ground, and
a toggle operating member structured to open and close the separable contacts of said toggle electrical switching apparatus,
wherein said electrical bus structure is powered from a three-phase power source; and wherein said feeder or line buss rail carries a first plurality of sockets for a first phase of said three-phase power source, a second plurality of sockets for a second phase of said three-phase power source, and a third plurality of sockets for a third phase of said three-phase power source.

13. The circuit breaker assembly of claim 12 wherein each of said controllable circuit breakers further comprises a conductive mounting bracket opposite said plug-in members; wherein said electrical bus structure further comprises a ground bus and a ground bracket electrically coupled thereto; and wherein said ground bracket is electrically and mechanically coupled to said conductive mounting bracket in order to ground said conductive mounting bracket and retain the plug-in members of said controllable circuit breakers in said two of the plug-in sockets.

14. The circuit breaker assembly of claim 12 wherein said at least a third terminal is a plurality of sockets of a socket connector; and wherein said backplane further comprises a pin header electrically engaging the socket connector.

15. The circuit breaker assembly of claim 14 wherein the sockets of said socket connector include a first socket for an indicator/control unit signal, a second socket for control power, a third socket for an open/close signal, and a plurality of sockets for a plurality of auxiliary circuits.

16. The circuit breaker assembly of claim 12 wherein said electrical bus structure comprises a first L-shaped phase buss for the first phase of said three-phase power source, a second T-shaped phase buss for the second phase of said three-phase power source, and a third inverted L-shaped phase buss for the third phase of said three-phase power source.

17. The circuit breaker assembly of claim 12 wherein a plurality of said controllable circuit breakers are electrically connected in series.

18. The circuit breaker assembly of claim 12 wherein said trip mechanism is further structured to source a current to said third terminal when said trip mechanism cooperates with said operating mechanism to trip open said separable contacts responsive to a thermal overload condition operatively associated with said separable contacts; and wherein said toggle electrical switching apparatus is structured to respond to said sourced current and trip open the separable contacts of said toggle electrical switching apparatus.

19. The circuit breaker assembly of claim 12 wherein the electrical bus structure of said backplane receives a plurality of three-phase power source inputs.

20. The circuit breaker assembly of claim 12 wherein the toggle electrical switching apparatus is a local toggle circuit breaker mounted to the backplane.

21. A circuit breaker assembly comprising:
a backplane comprising:
an electrical bus structure; and
a plurality of plug-in sockets;
a plurality of controllable circuit breakers, each of said controllable circuit breakers comprising:
separable contacts,
an operating mechanism structured to open and close said separable contacts,
a trip mechanism cooperating with said operating mechanism to trip open said separable contacts,
a first plug-in member,
a second plug-in member, and
at least a third terminal,
wherein said first and second plug-in members plug into two of the plug-in sockets, and
wherein said trip mechanism is structured to trip open said separable contacts responsive to a signal from said third terminal; and
a toggle electrical switching apparatus comprising:
separable contacts electrically connected between the third terminal and ground, and
a toggle operating member structured to open and close the separable contacts of said toggle electrical switching apparatus,
wherein said at least a third terminal is a plurality of sockets of a socket connector; and wherein said backplane further comprises a pin header electrically engaging the socket connector.

22. The circuit breaker assembly of claim 21 wherein the electrical bus structure of said backplane receives a plurality of three-phase power source inputs.

23. The circuit breaker assembly of claim 21 wherein the toggle electrical switching apparatus is a local toggle circuit breaker mounted to the backplane.

* * * * *